(12) United States Patent
Goncalves et al.

(10) Patent No.: US 10,351,120 B2
(45) Date of Patent: Jul. 16, 2019

(54) RAIL VEHICLE BRAKING SYSTEM AND BRAKING METHOD FOR A RAIL VEHICLE COMPRISING SUCH A SYSTEM

(71) Applicant: FAIVELEY TRANSPORT AMIENS, Amiens (FR)

(72) Inventors: Claudino Goncalves, Ribeaucourt (FR); Evi Ferron, Vecquemont (FR); Gilles Boisseau, Amiens (FR); Louis Sellier, Villers Bretonneux (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 217 days.

(21) Appl. No.: 15/541,950

(22) PCT Filed: Dec. 30, 2015

(86) PCT No.: PCT/FR2015/053768
§ 371 (c)(1),
(2) Date: Jul. 6, 2017

(87) PCT Pub. No.: WO2016/113484
PCT Pub. Date: Jul. 21, 2016

(65) Prior Publication Data
US 2018/0001882 A1  Jan. 4, 2018

(30) Foreign Application Priority Data
Jan. 13, 2015  (FR) .................................... 15 50255

(51) Int. Cl.
*B60T 17/16* (2006.01)
*B60T 13/26* (2006.01)
(Continued)

(52) U.S. Cl.
CPC ............ *B60T 17/16* (2013.01); *B60T 13/266* (2013.01); *B60T 13/665* (2013.01); *B60T 17/228* (2013.01); *B61H 5/00* (2013.01); *B61H 13/00* (2013.01); *F16D 55/2245* (2013.01); *F16D 2125/66* (2013.01); *F16D 2127/06* (2013.01); *F16D 2129/02* (2013.01); *F16D 2129/08* (2013.01)

(58) Field of Classification Search
CPC ...... B60T 17/16; B60T 13/266; B60T 13/665; B60T 17/228; B61H 5/00; F16D 55/2245
See application file for complete search history.

(56) References Cited

U.S. PATENT DOCUMENTS 3,874,747 A    4/1975  Case et al.
6,311,808 B1 * 11/2001  Halasy-Wimmer ..... B60R 25/08
                                                   188/106 F (Continued)

FOREIGN PATENT DOCUMENTS

EP    2 154 040 A1   2/2010
WO    94/15821 A1    7/1994

OTHER PUBLICATIONS

International Search Report, dated Mar. 23, 2016, from corresponding PCT/FR2015/053768 application.

*Primary Examiner* — Thomas J Williams
*Assistant Examiner* — James K Hsiao
(74) *Attorney, Agent, or Firm* — Young & Thompson (57) ABSTRACT

Disclosed is a railway braking system including a service brake supplied by a first source, a parking brake having a device for immobilizing the service brake and a mobile control device for mobile control of the immobilizing device, and a command and control unit configured to receive information indicative of a value of the first source, process information indicative of a parking brake setpoint so as to actuate the control device, and determine a value of a second source according to the setpoint and to the information indicative of a value of the first source, so as to supply a pressure chamber of the service brake.

26 Claims, 6 Drawing Sheets

(51) Int. Cl.
　　　　*B60T 13/66*　　　(2006.01)
　　　　*B61H 5/00*　　　　(2006.01)
　　　　*F16D 55/224*　　　(2006.01)
　　　　*B60T 17/22*　　　 (2006.01)
　　　　*B61H 13/00*　　　 (2006.01)
　　　　*F16D 127/06*　　　(2012.01)
　　　　*F16D 129/02*　　　(2012.01)
　　　　*F16D 125/66*　　　(2012.01)
　　　　*F16D 129/08*　　　(2012.01)

(56)　　　　　　　　References Cited

U.S. PATENT DOCUMENTS

| | | | | |
|---|---|---|---|---|
| 7,264,093 | B2 * | 9/2007 | Hashida | B60T 8/32 |
| | | | | 188/106 P |
| 7,325,887 | B2 * | 2/2008 | McCann | B60T 1/005 |
| | | | | 188/72.9 |
| 7,604,302 | B1 * | 10/2009 | Lee | B60T 13/662 |
| | | | | 192/219.4 |
| 8,944,527 | B2 * | 2/2015 | Schrader | B60T 17/16 |
| | | | | 188/170 |
| 8,996,270 | B2 * | 3/2015 | Bieltz | B60T 13/746 |
| | | | | 188/156 |
| 9,031,756 | B2 * | 5/2015 | Baehrle-Miller | B60T 7/042 |
| | | | | 701/70 |
| 9,068,613 | B2 * | 6/2015 | Baehrle-Miller | F16D 65/18 |
| 9,272,692 | B2 * | 3/2016 | Bieltz | B60T 7/042 |
| 9,340,192 | B2 * | 5/2016 | Schwarz | B60T 7/042 |
| 9,482,298 | B2 * | 11/2016 | Cann | F16D 65/18 |
| 9,855,934 | B2 * | 1/2018 | Yasui | B60T 7/122 |
| 2010/0294601 | A1 * | 11/2010 | Kraus | B60T 17/083 |
| | | | | 188/72.2 |
| 2014/0345987 | A1 * | 11/2014 | Elstorpff | B60T 17/086 |
| | | | | 188/107 |

* cited by examiner

RAIL VEHICLE BRAKING SYSTEM AND BRAKING METHOD FOR A RAIL VEHICLE COMPRISING SUCH A SYSTEM

The invention concerns the field of rail vehicle brakes.

It more particularly concerns the rail vehicle braking systems provided with a service brake and with a parking brake configured to act on a braking linkage.

It also concerns the braking methods for rail vehicles comprising such braking systems.

Rail vehicles are generally equipped with service brake cylinders comprising a piston movable under the effect of a fluid under pressure, the movement of that piston driving a braking action such as the clamping of a disk brake between two linings, or the direct pressure of a block against a vehicle wheel.

These brake cylinders also generally comprise a parking or emergency actuator which is actuated in case of pressure loss of the fluid under pressure and/or in case of intentional venting (or draining) or leakage of the pneumatic system. This actuator, also termed parking brake, makes it possible to provide braking by virtue of the load of a spring substituting for the load of the fluid. Once this parking brake has been activated, the brake remains continuously engaged.

A rail vehicle braking system is known from European patent application EP 2 154 040 which is provided with a parking brake actuator coupled to a rail service brake cylinder. This brake cylinder comprises a body and a piston which is movable relative to the body to act on the braking linkage via a thrust rod.

The brake cylinder also comprises a pressure chamber delimited by the piston and by the body and which is connected by a pipe to a source of pneumatic pressure agent to put the piston into a service braking position.

The parking brake comprises a body which is distinct from the brake cylinder body. The body of the parking brake has an opening facing the piston of the service brake cylinder, which opening slidingly receives a thrust sleeve fitting into that opening in a fluid-tight manner.

The parking brake also comprises a piston movably mounted in a cylinder attached to the body and delimiting with that body a parking brake pressure chamber. This parking brake pressure chamber is connected to another source of pneumatic pressure agent via a pipe. The piston comprises at its center an aperture passed through by the thrust sleeve.

The parking brake further comprises springs which continuously bias the piston of that parking brake towards a position referred to as low in which the parking brake is considered as being in a working configuration.

To actuate the parking brake when the piston of the service brake cylinder is in service braking position, the pressure chamber of the parking brake (filled in advance with the pneumatic pressure agent) is vented and the springs of the parking brake then act on the piston of the parking brake, which drives the sleeve until the latter comes to bear against the piston of the service brake cylinder.

The pressure chamber of the service brake cylinder may then be vented since the parking brake has been actuated.

The load applied by the parking brake on the service brake piston is directly related to the load produced by the springs. This load naturally depends on the stiffness and the extension of those springs.

With this braking system, the force applied on the braking linkage by the piston of the service brake cylinder when the parking brake has been actuated and the service brake cylinder has been vented is often less than the force applied by that same piston when it is in service braking position.

The invention concerns a rail vehicle braking system, having improved performance relative to the braking systems of the above-mentioned prior art, while being simple, convenient and economic.

According to a first aspect, the invention thus relates to a rail vehicle braking system with brakes that have at least one lining or at least one block, comprising:

a body;

a braking linkage configured to act on at least one said brake that has at least one lining or at least one block;

a service brake comprising a braking piston which is movable relative to said body to act on said braking linkage and delimits with said body a service brake pressure chamber configured to be supplied by a first source of pneumatic pressure agent to put said braking piston into a service braking position; and a parking brake configured to act on said braking piston of said service brake and having a working configuration and a resting configuration;

said rail vehicle braking system being characterized in that said parking brake comprises:

a blocking device which is movable relative to said body to act on said braking piston and having a first position and a second position in which said blocking device is configured to immobilize said braking piston in service braking position, said parking brake then being in working configuration;

an actuating device which is movable relative to said body and having a locking position in which said actuating device is configured to hold said blocking device in its second position;

said rail vehicle braking system being configured such that, when said actuating device is in its locking position, said service brake pressure chamber is supplied by a second source of pneumatic pressure agent of which the pressure value is determined, in order to apply, when said parking brake is in working configuration, a determined braking force;

said rail vehicle braking system further comprising a control and actuation unit configured to:

receive an information item representing a value of said first source of pneumatic pressure agent;

process an information item representing a parking brake setting at least in its working configuration, for the purpose of actuating said movable actuating device at least in its locking position; and determine a value of said second source of pneumatic pressure agent according to said parking brake setting and said information item representing a value of said first source of pneumatic pressure agent, for the purpose of supplying said service brake pressure chamber.

In the braking system according to the invention, the braking piston is immobilized in service braking position by the parking brake and in particular by its blocking device. This means that the braking piston may be immobilized in any position, which position is linked to the travel which that piston has travelled and that travel depends on the force applied in the service braking phase.

By the term immobilize is meant the fact that the force applied by the braking piston on the braking linkage in the working configuration of the parking brake does not reduce, or almost not.

A certain loss is however accepted linked to the retraction of the braking piston, in particular on the slight movement of the piston relative to the blocking device, at the time the service brake pressure chamber is vented. This loss is controlled and is defined by a very slight reduction in the force applied which is due in particular to the manufacturing tolerances both of the blocking device and of the braking piston. This reduction in the force applied on the braking linkage is here called losses on retraction. An acceptable value for these losses on retraction is at maximum of the order of 10% to 15% of the force applied by the service brake at the time the parking brake is actuated to be in working configuration.

Thanks to the invention and in particular to the configuration of the braking piston and of the parking brake, the springs of the known braking systems described above are in particular dispensed with which make it possible to apply the parking brake force on the braking linkage via the service brake cylinder piston. Thus, for the same force applied on the braking linkage when the parking brake is in working configuration, the braking system according to the invention is more compact than the aforementioned braking systems of the prior art, and also lighter.

It should be noted that the braking linkage advantageously has deformable arms of which the elasticity may substitute for that of the springs of the known braking systems described above.

It should be noted that the configuration of the parking brake is chosen such that the load applied directly by the blocking device to immobilize the braking piston is not generally greater than the load applied by the springs on the piston of the aforementioned braking systems of the prior art; while the force applied on the braking linkage when the parking brake of the system according to the invention is in working configuration is preferably at least equal to or even greater than that procured by the aforementioned braking systems of the prior art.

By virtue of its configuration, the braking system according to the invention may furthermore make it possible to momentarily supply the service brake pressure chamber with the second source of pneumatic pressure agent in order to increase the braking force applied to the braking linkage by the service brake piston. The braking force applied to the braking linkage when the parking brake is in its working configuration is therefore increased further by it.

The system according to the invention may thus make it possible to obtain service brake and parking brake braking forces greater than those obtained with the aforementioned braking systems of the prior art, simply, conveniently and economically, while affording particularly good safety provision.

Furthermore the control and actuation unit of the system according to the invention enables particularly simple and convenient management of at least the pressure value of the second source of pneumatic pressure agent which supplies the service brake pressure chamber when the parking brake is in its working configuration. This pressure value is managed here according to the pressure value of said first source of pneumatic pressure agent which serves to supply the service brake chamber in particular when the parking brake is not in its working configuration and according to a parking brake setting.

It will be noted that the first source of pneumatic pressure agent generally makes it possible to supply the service brake pressure chamber when the parking brake is not in working configuration, to apply a service braking force, in accordance with a service brake setting. This same first source of pneumatic pressure agent may also make it possible to supply the service brake pressure chamber when the parking brake is not in working configuration, to apply an emergency braking force rather than a service braking force, in accordance with an emergency brake setting.

It may be considered here that the emergency brake force is a service brake force which is modified by an emergency parameter. Therefore, the statements used below concerning the values and template values of said first source of pneumatic pressure agent as well as the service brake settings encompass both the actions to apply a service brake force as described above and the actions to apply an emergency brake force.

According to preferred, simple, convenient and economical features of the system according to the invention:

said information item representing said value of said first source of pneumatic pressure agent and said information item representing said parking brake setting each correspond to an electrical or pneumatic or mechanical signal;

said actuating device delimits with said body a parking brake pressure chamber configured to be supplied by a third source of pneumatic pressure agent, said control and actuation unit being furthermore configured to determine a value of said third source of pressure agent according to said parking brake setting, for the purpose of actuating said movable actuating device at least in its locking position;

said actuating device is configured to be electrically actuated, said control and actuation unit being furthermore configured to determine an electrical energy value according to said parking brake setting, for the purpose of actuating said movable actuating device at least in its locking position;

said determined pressure value of said second source of pneumatic pressure agent is greater than, equal to or less than that of said first source of pneumatic pressure agent, in order to apply, when said parking brake is in working configuration, a braking force respectively greater than, equal to or less than the braking force applied when said braking piston is in its service braking position and said parking brake is in its resting configuration;

said control and actuation unit is furthermore configured to determine a corrected value of said first source of pneumatic pressure agent and said determined value of said second source of pneumatic pressure agent is equal to said corrected value;

said determined value of said second source of pneumatic pressure agent is constant or variable according to said received information item representing said value of said first source of pneumatic pressure agent;

said control and actuation unit is furthermore configured to receive an information item representing a service brake setting and to determine said parking brake setting according to said received information item representing said service brake setting; and/or said control and actuation unit is configured to determine said parking brake setting according to said information item representing said value of said first source of pneumatic pressure agent, considering that it may directly be a pressure value of said first source or a template value of said first source;

said control and actuation unit is furthermore configured to receive at least one information item representing at least one parameter of use of said rail vehicle and said value of said second source of pneumatic pressure agent is furthermore determined according to said at least one information item representing of said at least one parameter of use of said rail vehicle;

said control and actuation unit is furthermore configured to receive at least one information item representing at least one parameter of use of said rail vehicle and to determine said parking brake setting according to said at least one information item representing said at least one parameter of use of said rail vehicle;

said at least one parameter of use of said rail vehicle is chosen from a traction parameter, a velocity parameter, a load parameter, an anti-wheel slide parameter, a pneumatic pressure parameter and an electrical energy parameter;

said control and actuation unit is in fluidic communication with a conveyance network of pneumatic pipes, which network comprises a main pipe and a general pipe which are configured to convey a fluid at least at a predetermined first pressure, optionally a first auxiliary reservoir configured to store a fluid at a predetermined second pressure and which is connected to said main pipe, and/or also optionally a second auxiliary reservoir (75) configured to store a fluid at a predetermined third pressure and which is connected to said main pipe;

said conveyance network of pneumatic pipes further comprises a first supply pipe connected between said control and actuation unit and said service brake pressure chamber and configured to convey a fluid at a pressure coming from at least one of the first and second sources of pneumatic pressure agent;

said conveyance network of pneumatic pipes further comprises a second supply pipe connected between said control and actuation unit and said parking brake pressure chamber and configured to convey a fluid at a pressure coming from the third source of pneumatic pressure agent;

said conveyance network of pneumatic pipes further comprises a dedicated intermediate pipe configured to convey solely a fluid coming from said second source of pneumatic pressure agent when said parking brake is in working configuration, into said service brake pressure chamber;

said control and actuation unit is configured to supply said service brake pressure chamber via said dedicated intermediate pipe by shunting said first supply pipe;

said control and actuation unit comprises a relay device configured to receive, as input to relay device, a template value of said first source of pneumatic pressure agent, and to generate and provide, as output from said relay device, said value of said first source of pneumatic pressure agent; and said control and actuation unit is furthermore configured to receive, downstream of said relay device, an intermediate value from said second source of pneumatic pressure agent which substitutes for or combines with said value of said first source of pneumatic pressure agent to generate said determined value of said second source of pneumatic pressure agent;

said control and actuation unit comprises a relay device configured to receive, as input to said relay device a template value of said first source of pneumatic pressure agent and a template value of said second source of pneumatic pressure agent which substitutes for or combines with said template value of said first source of pneumatic pressure agent, and to generate and provide, as output from said relay device, said determined value of said second source of pneumatic pressure agent;

said control and actuation unit comprises a relay device configured to:

receive, as input to said relay device, a template value of said first source of pneumatic pressure agent;

receive, in said relay device, an intermediate value or a template value of said second source of pneumatic pressure agent; and generate and provide, as output from said relay device, said determined value of said second source of pneumatic pressure agent;

said control and actuation unit comprises an anti-wheel-slide device and is configured to generate said determined value of said second source of pneumatic pressure agent based on said value of said first source of pneumatic pressure agent and an intermediate value of said second source of pneumatic pressure agent which substitutes for or combines with said value of said first source of pneumatic pressure agent, either downstream or upstream of said anti-wheel-slide device;

said control and actuation unit further comprises a generating device for generating the value of said first source of pneumatic pressure agent configured to receive, as input to said generating device, a service brake setting, and to generate and provide, as output from said generating device, said value of said first source of pneumatic pressure agent; and said control and actuation unit is furthermore configured to receive, downstream of said generating device, an intermediate value of said second source of pneumatic pressure agent which substitutes for or combines with said value of said first source of pneumatic pressure agent to generate said determined value of said second source of pneumatic pressure agent;

said control and actuation unit comprises a generating device for generating the value of said first source of pneumatic pressure agent configured to receive, as input to said generating device, a service brake setting and a parking brake setting which substitutes for or combines with said service brake setting, and to generate and provide, as output from said generating device, said determined value of said second source of pneumatic pressure agent; and/or said control and actuation unit comprises a generating device for generating the value of said first source of pneumatic pressure agent configured to:

receive, as input to said generating device, a service brake setting;

receive, in said generating device, a parking brake setting or an intermediate value of said second source of pneumatic pressure agent; and generate and provide, as output from said generating device, said determined value of said second source of pneumatic pressure agent; and/or said control and actuation unit is furthermore configured to receive at least one information item representing a load parameter of said vehicle; determine a fictional load parameter of said vehicle according to said parking brake setting and/or said determined value of said second source of pneumatic pressure agent; and substitute said received load parameter with said determined fictional load parameter.

According to a second aspect, the invention also relates to a method of braking a rail vehicle, comprising a rail vehicle braking system as described above, comprising:

the step of receiving an information item representing a value of said first source of pneumatic pressure agent;

the step of supplying the service brake pressure chamber of said system with said value of said first source of pneumatic pressure agent so as to put said braking piston in service braking position;

the step of processing an information item representing a parking brake setting at least in its working configuration;

the step of actuating said movable actuating device at least in its locking position, according to said parking brake setting; and the step of determining a value of said second source of pneumatic pressure agent according to said parking brake setting and said information item representing a value of said first source of pneumatic pressure agent, for the purpose of supplying said service brake pressure chamber.

The method according to the invention is particularly simple and convenient to implement.

According to preferred, simple, convenient and economical features of the method according to the invention, it further comprises the step of supplying said service brake pressure chamber with said value of said second source of pneumatic pressure agent; and the step of venting said service brake pressure chamber.

The disclosure of the invention will now be continued with the description of embodiments, given below by way of illustrative and non-limiting examples, with reference to the accompanying drawings, in which.

Figure 1:
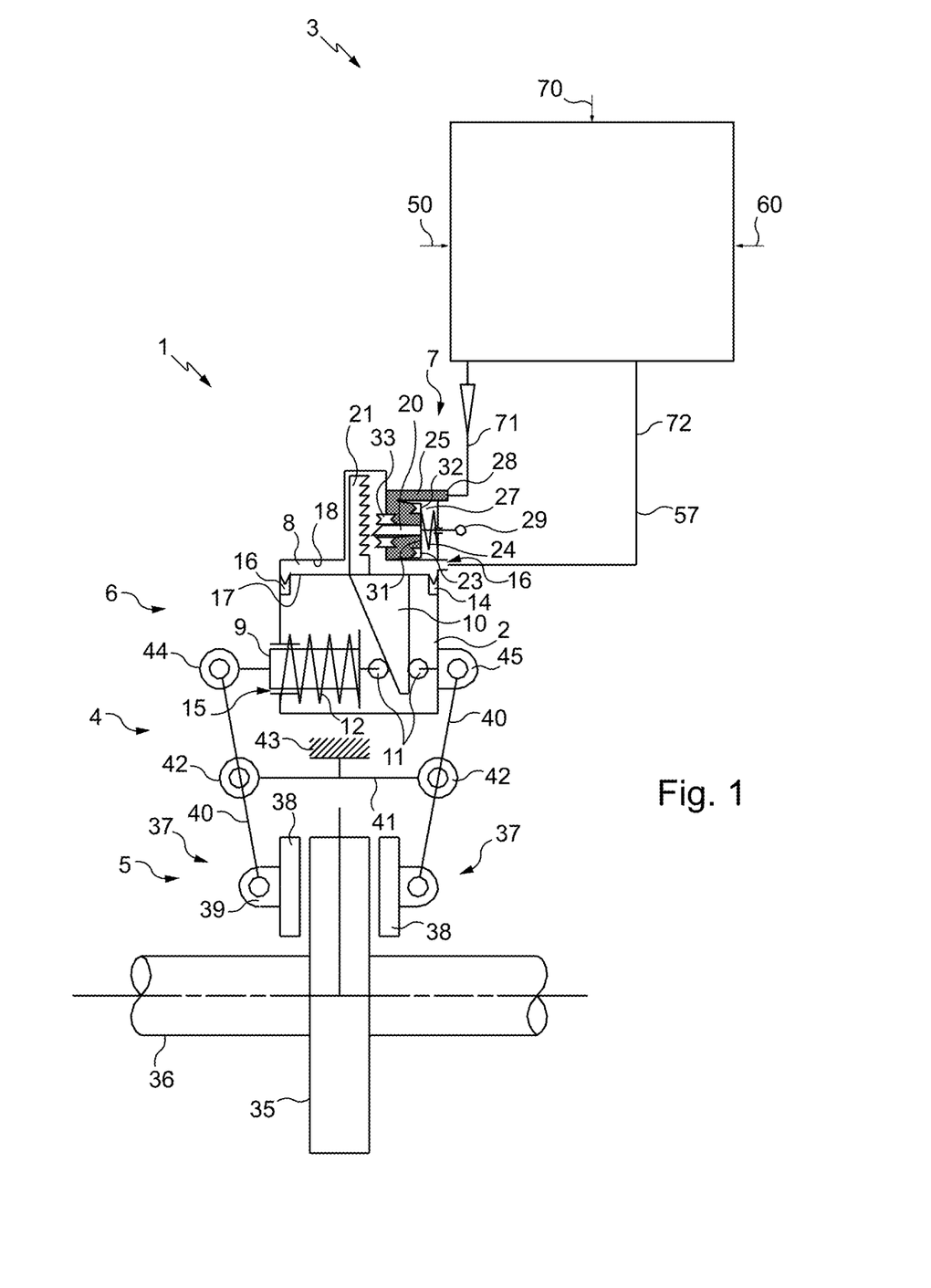
FIG. 1 diagrammatically and partially illustrates a rail vehicle braking system in accordance with a first embodiment of the invention, which system is provided with a control and actuation unit.

FIG. 1 diagrammatically represents a rail vehicle braking system 1 of a rail vehicle with a brake having linings or blocks.

The rail vehicle braking system 1 comprises a body 2 here forming a cylinder of a service brake 6 and a parking brake 7, a control and actuation unit 3 configured to manage the operation of the service brake 6 and of the parking brake 7, a conveyance network of pneumatic pipes that is connected to the body 2 and to the control and actuation unit 3, a braking linkage 4 mechanically linked to the body 2 as well as a brake 5 with linings on which the braking linkage 4 is configured to act.

The body 2 here has the form of a generally closed envelope.

The service brake 6 comprises a service brake piston 8 movable relative to the body 2 in a first axial direction, and a thrust rod 9 also movable relative to the body 2 in a second axial direction perpendicular to the first axial direction.

Together with the body 2 the braking piston 8 delimits a service brake pressure chamber 13.

The braking piston 8 has two sides respectively a first side 17 configured to act on the braking linkage 4 via the thrust rod 9 and a second side 18 which is an opposite side to the first side 17 and which is turned towards the service brake pressure chamber 13.

The service brake 6 further comprises a notched rod 21 fastened to the second side 18 of the braking piston 8. This notched rod 21 extends longitudinally in the first axial direction.

The braking piston 8 is configured to move in the body 2 while maintaining the service brake pressure chamber 13 relatively fluid-tight thanks to a membrane 14 disposed between that braking piston 8 and inside edges of the body 2.

The service brake 6 further comprises a wedge part 10 fastened to the first side 17 of the braking piston 8.

This wedge part 10 has a triangular section and is configured to cooperate with a set of rolling bearing stops 11, of which one of the rolling bearing stops is linked to the body 2 while the other of the rolling bearing stops is linked to the thrust rod 9.

This thrust rod 9 is provided with a wear adjuster configured to compensate for the wear of the linings of the brake 5 in order to avoid reduction of the braking force by excessive play (further to wear of the linings).

The service brake 6 further comprises a spring 12 here disposed around the thrust rod 9, between the rolling bearing stop which is linked to the latter and the inside edge of the body 2. This spring 12 is configured to return the stop which is linked to the thrust rod 9 against the wedge part 10.

The service brake 6 further comprises a first aperture 15 formed in the body 2 and configured to enable the movement of the thrust rod 9 through that first aperture 15.

The service brake 6 further comprises a second aperture 16 formed in the body 2 and opening into the service brake pressure chamber 13.

The service brake pressure chamber 13 is connected here by a first supply pipe 72 of the conveyance network of pneumatic pipes, also called service brake and emergency brake pipe, which is connected at the location of that second aperture 16, to a source of fluid under pressure, for example such as a pneumatic line.

The body 2 comprises a cavity 27 situated against the service brake pressure chamber 13 and in which is disposed the parking brake 7.

The parking brake 7 comprises a blocking device here formed by a blocking finger 20 movable relative to the body 2 and extending in the second axial direction.

The parking brake 7 further comprises here a holding piston 23 movable relative to the body 2 and with the latter delimiting a parking brake pressure chamber 25.

This holding piston 23 has two sides, respectively a first side 31 on which is attached the blocking finger 20 and a second side 32 which is an opposite side to the first side 31 and which is turned towards the parking brake pressure chamber 25.

The parking brake 7 further comprises here a spring member 24 disposed between the body 2 and the second side 32 of the holding piston 23. This spring member 24 is configured to act on that holding piston 23 and therefore on the blocking finger 20.

It should be noted that the holding piston 23 and the spring member 24 here form a movable actuating device of the parking brake 7.

The holding piston 23 is configured to move in the body 2 while maintaining the parking brake pressure chamber 25 relatively fluid-tight thanks to a membrane (not shown) disposed between that holding piston 23 and the inside edges of the body 2.

The parking brake 7 comprises a third aperture (not shown) formed in the body 2 and opening both into the parking brake pressure chamber 25 and into the service brake pressure chamber 13, which third aperture is configured to enable the movement of the blocking finger 20 through that third aperture.

It should be noted that the relative sealing between the parking brake pressure chamber 25 and the service brake pressure chamber 13 is ensured by the presence of a seal 33 disposed at the interface between that third aperture and the blocking finger 20.

The parking brake 7 further comprises a fourth aperture 28 formed in the body 2 and opening into the parking brake pressure chamber 25.

This parking brake pressure chamber 25 is connected here by a second supply pipe 71 of the conveyance network of pneumatic pipes, also called parking brake pipe, which is connected at the location of that fourth aperture 28, to a source of fluid under pressure, for example such as a pneumatic line.

The parking brake 7 further comprises an unlocking part 29 attached to the second side 32 of the holding piston 23 and opening outside the body 2 through a fifth aperture (not shown) formed in that body 2 and opening into the cavity 27; such that this unlocking part 29 is accessible to be manipulated from outside the body 2, if required.

The service brake 6 is disposed in the body 2 and is configured to act on the brake 5 via the braking linkage 4.

This brake 5 comprises a brake disk 35 (here viewed from above) mounted for example on a rail vehicle axle 36, or directly on the wheel to brake.

This brake 5 further comprises two shoes 37 each provided with a lining 38 configured to be applied in contact with the disk 35 to reduce its rotational speed and therefore that of the wheel to brake, as well as a fastening eye 39 provided at the remote opposite location to the surface of the lining 38 that is configured to be applied to the disk brake 35.

The braking linkage 4 comprises two or four deformable levers 40 each provided with an upper portion and a lower portion which are attached to each other. Only two levers are illustrated here and, in the case of the linkage having four levers, they may be attached in pairs or as a variant be independent from each other.

Each portion of the levers 40 is jointed to a central connector 41 via two pivots 42.

The lower portion of each deformable lever 40 is linked to one of the shoes 37 via its fastening eye 39.

The upper portion of each deformable lever 40 is linked to a respective joint 44, 45.

The braking linkage 4 receives the body 2 between the upper portions of the deformable levers 40, at the location of the joints 45 and 46.

The body 2 is rotatably mounted on the joint 44 which is attached to an end of the thrust rod 9 whereas it has a fixed mounting to the joint 45, which is directly attached to that body 2.

The braking linkage 4 also comprises a fastening lug 43 attached to the central connector 41 for the mounting of that braking linkage 4 on the rail vehicle; in order for the brake shoes 37 to be situated on respective opposite sides of the brake disk 35 (or of the rail vehicle wheel).

It should be noted that the coming towards each other of the joints 44 and 45 enables the shoes 37 to move apart from each other and that conversely, the separation of those joints 44 and 45 enables the shoes 37 to be to clamped onto the brake disk 35 (or onto the rail vehicle wheel).

The conveyance network of pneumatic pipes here comprises a main pneumatic line formed by main and general pipes 70 which are configured for conveyance by each along the rail vehicle.

The general and main pipes 70 are distinct, are not attached together and extend generally in parallel. The general pipe enables pneumatic continuity to be ensured along the train and enables the service braking of the train, by directly using the fluid passing through the general pipe. As for the main pipe, this enables supply of equipment in particular of the rail vehicle braking system, for example reservoirs (see below for more detail).

This network further comprises a pneumatic supply line for supplying the service and parking brake chambers, respectively 13 and 25, which is formed in particular by the first and second supply pipes 72 and 71.

The control and actuation unit 3 is connected to the service brake pressure chamber 13 via the first supply pipe 72 to which it is connected.

The control and actuation unit 3 is also connected here to the parking brake pressure chamber 25 via the second supply pipe 71 to which it is connected.

The control and actuation unit 3 comprises system members (not shown) which are configured to receive and process representational information relative to operational settings of the rail vehicle, by a first electrical and/or pneumatic and/or manual type channel, denoted 50 in FIG. 1.

These system members may for example be formed by pneumatic relays and/or electrical relays and/or electronic cards and/or central processing units or microprocessors, and/or random access memory components comprising registers adapted to record variables of the parameters created and modified during the execution of programs, and/or communication interfaces configured to send and receive data, and/or internal storage members, such as hard disks, able in particular to store the executable code of programs enabling the management of the service and parking brakes 6 and 7.

These system members are furthermore configured to receive and process representational information relative to parameters of use of the rail vehicle, by a second channel of electrical and/or pneumatic and/or manual type, which is denoted 60 in FIG. 1.

It will be noted that in FIG. 1, the control and actuation unit 3 is associated with a braking linkage and with a single brake 5 of the rail vehicle. As a variant, such a control and actuation unit may be associated with an axle (not shown) of the rail vehicle, provided with a plurality of brakes 5, or with a bogie (not shown) of the rail vehicle, provided with two axles, or for instance with a wagon (not shown) of the rail vehicle, provided with two bogies, or it is possible for the rail vehicle not to comprise such a control and actuation unit.

Figure 2:
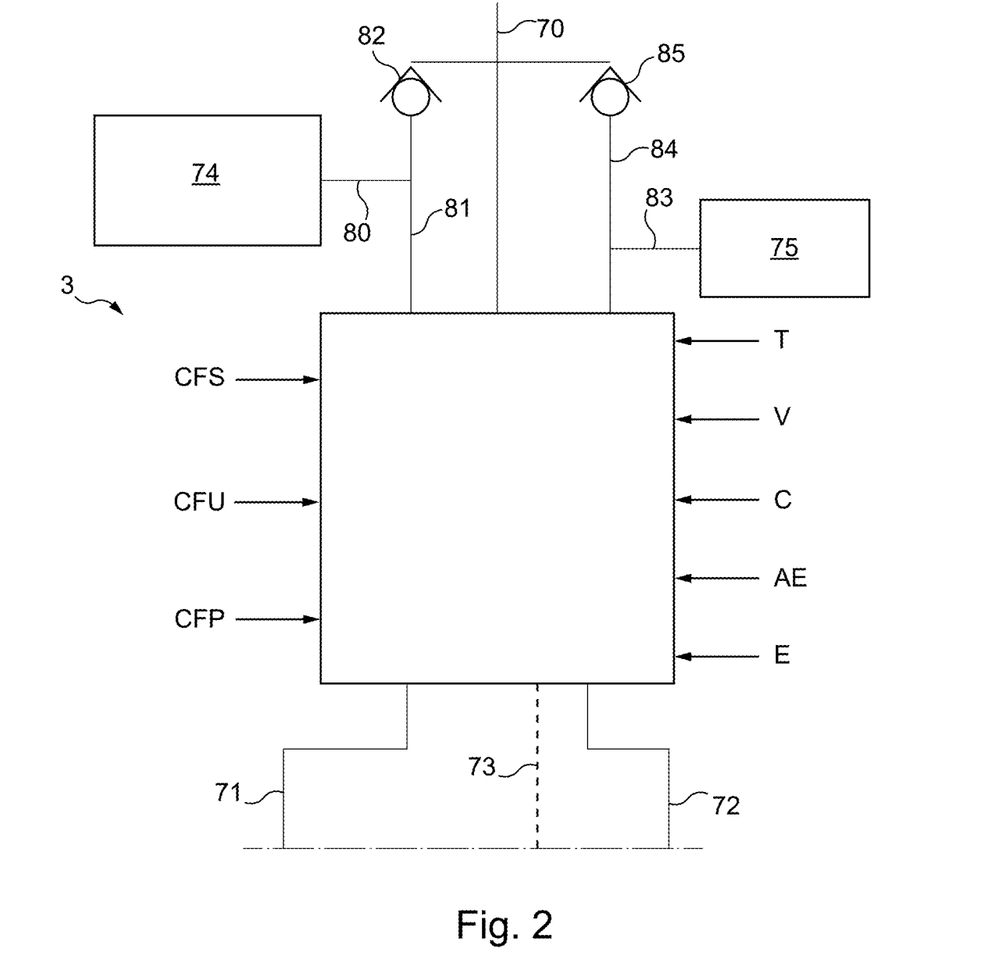
FIG. 2 diagrammatically represents the control and actuation unit and a conveyance network of pipes of the system, which is connected to that unit.

FIG. 2 diagrammatically represents in more detail both the routing network of pneumatic pipes and the first and second channels by which pass the representational information received by the control and actuation unit 3.

The main line of the network comprises a first point of branching to a first auxiliary pipe 81 connected, at one end, to the general pipe of the pipes 70 and at an opposite end, to the control and actuation unit 3.

The network is provided with a first auxiliary reservoir 74 connected to the first auxiliary pipe 81 via a first connecting pipe 80.

This first auxiliary reservoir 74 is supplied by the main pipe of the pipes 70 and the network is furthermore provided with a first non-return valve 82 mounted on the first auxiliary pipe 81, between the main pipe and the first auxiliary reservoir 74.

The main pipe is configured to convey a fluid under a predetermined pressure. The auxiliary reservoir 74 thus comprises a fluid at such a predetermined first pressure.

Such a first auxiliary reservoir 74 may for example be present on each bogie of the rail vehicle.

The main line of the network further comprises a second point of branching to a second auxiliary pipe 84 connected, at one end, to the main pipe and at an opposite end, to the control and actuation unit 3.

The network is provided with a second auxiliary reservoir 75 connected to the second auxiliary pipe 84 via a second connecting pipe 83.

This second auxiliary reservoir 75 is supplied by the main pipe and the network is furthermore provided with a second non-return valve 85 mounted on the second auxiliary pipe 84, between the main pipe and the second auxiliary reservoir 75.

The main pipe is configured to convey a fluid under a predetermined pressure. The auxiliary reservoir 74 thus comprises a fluid at such a predetermined first pressure.

Such a second auxiliary reservoir 75 may for example be present on each bogie of the rail vehicle.

It will be noted that the main pipe and the general pipe, the first and second auxiliary pipes 81 and 84 and the first and second auxiliary reservoirs 74 and 75 are situated here diagrammatically upstream of the control and actuation unit 3 and are connected at the inlet to that control and actuation unit 3.

By contrast, the first and second supply pipes 71 and 72 are situated here diagrammatically downstream of the control and actuation unit 3 and are connected to the outlet of that control and actuation unit 3.

The network further comprises a third supply pipe 73, also called dedicated intermediate pipe, situated diagrammatically downstream of the control and actuation unit 3 and also connected at the outlet of that control and actuation unit 3.

This third supply pipe 73 is furthermore connected at the location of the second aperture 16 of the service brake chamber 13, in the same way as the first supply pipe 72.

The third supply pipe 73 is configured to convey a fluid coming from a source of pneumatic pressure agent solely when the parking brake 6 is in a working configuration (see below), that is to say by shunting the service brake pipe 72.

Among the operating settings of the rail vehicle, the control and actuation unit 3 is configured to receive and process at least one information item representing a service brake setting, denoted CFS, at least one information item representing a parking brake setting, denoted CFP, and at least one information item representing an emergency brake setting, denoted CFU.

As mentioned above, these settings may correspond to one or more electrical and/or pneumatic and/or mechanical signals.

Among the parameters of use of the rail vehicle, the control and actuation unit 3 is configured to receive at least one information item representing the traction of the vehicle, and/or at least one information item representing the velocity of the vehicle, and/or at least one information item representing the load of the vehicle, and/or at least one information item representing the anti-wheel-slide (or the wheel-slide) of the vehicle, and/or at least one information item representing values of pressure in the pneumatic pipes of the vehicle, in particular the main pipe, the general pipe, the auxiliary pipes 81 and 84 and the supply pipes 71, 72 and 73, and/or at least one information item representing an electrical energy of the vehicle.

Concerning the vehicle load, the information received may for example concern one wagon alone, or else several successive wagons or the entirety of the rail vehicle. This depends on the number of braking systems in accordance with the invention and the strategy of brake actuation.

It will furthermore be noted that certain parameters of operation of certain rail vehicles may naturally (or initially) be dependent on the vehicle load for example to manage the service brake whereas others are not dependent on the vehicle load.

The control and actuation unit 3 is configured here to receive the service brake setting CFS and at least one information item representing at least one of the aforementioned parameters of use of the rail vehicle.

As indicated above, this may be a service brake setting CFS or an emergency brake setting CFU.

The control and actuation unit 3 is furthermore configured to receive a value of a first source of pneumatic pressure agent configured to supply the service brake pressure chamber 13 when the service brake setting CFS is not null.

The control and actuation unit is furthermore configured to receive the parking brake setting CFP, or to determine that parking brake setting CFP depending on the parameter or parameters of use of the rail vehicle.

The control and actuation unit 3 is furthermore configured to determine a value of a third source of pneumatic pressure agent configured to supply, via the parking brake pipe 71, the parking brake pressure chamber 25 when the parking brake setting CFP is not null.

This value of the third source of pneumatic pressure agent is determined according to the parking brake setting CFP. For example, this value is null when the parking brake setting CFP is not null and the parking brake 6 must be applied.

The control and actuation unit 3 is furthermore configured to determine a value of a second source of pneumatic pressure agent configured to supply, via the service brake pipe 72 or via the dedicated intermediate pipe 73, the service brake pressure chamber 13 when the service brake setting CFP is not null.

This value of the second source of pneumatic pressure agent is determined according to the parking brake setting CFP, and/or the value of the first source of pneumatic pressure agent, and/or the service brake setting CFS, and/or the parameter or parameters of use of the rail vehicle.

The control and actuation unit 3 may be configured to determine a corrected value of the first source of pneumatic pressure agent, according to the parking brake setting CFP, and/or the value of the first source of pneumatic pressure agent, and/or the service brake setting CFS, and/or the parameter parameters of use of the rail vehicle and, the case arising, the determined value of the second source of pneumatic pressure agent is equal to this corrected value.

The value of the second source of pneumatic pressure agent may be determined so as to be constant, or as a variant, be variable according to the value of the first source of pneumatic pressure agent.

The operation of the rail vehicle braking system 1 will now be described with reference to FIG. 1 and FIGS. 3 to 6, which diagrammatically illustrate different configurations of the system 1.

In FIG. 1, the rail vehicle braking system 1 is in a resetting configuration. The service brake setting CFS, the emergency brake setting and the parking brake setting are null here.

In this resetting configuration, the service brake pressure chamber 13 is not supplied (it has been vented) such that the braking piston 8 is in a resting position, in which it does not apply any braking force on the thrust rod 9.

Therefore, the joints 44 and 45 of the braking linkage 4 are away from each other which allows the shoes 37 to be kept away from the brake disk 35.

As regards the parking brake pressure chamber 25, this is supplied by the parking brake pipe 71, in which is conveyed a third source of pneumatic pressure agent.

This third source of pneumatic pressure agent may come directly from the general pipe, or from the first auxiliary reservoir 74 or from the second auxiliary reservoir 75.

The parking brake pressure chamber 25 is thus under pressure such that the holding piston 23 is in a first position in which the spring member 24 is compressed and the blocking finger 20 is in a first position away from the notched rod 21 of the service brake 6.

In this resetting configuration of the system 1, the parking brake 7 is in a reset configuration whereas the service brake 6 is in a resting configuration.

It should be noted that the parking brake 7 is dimensioned and configured such that the pressure for resetting the parking brake 7 is relatively low, for example of the order of 2 bar to 6 bars.

Figure 3:
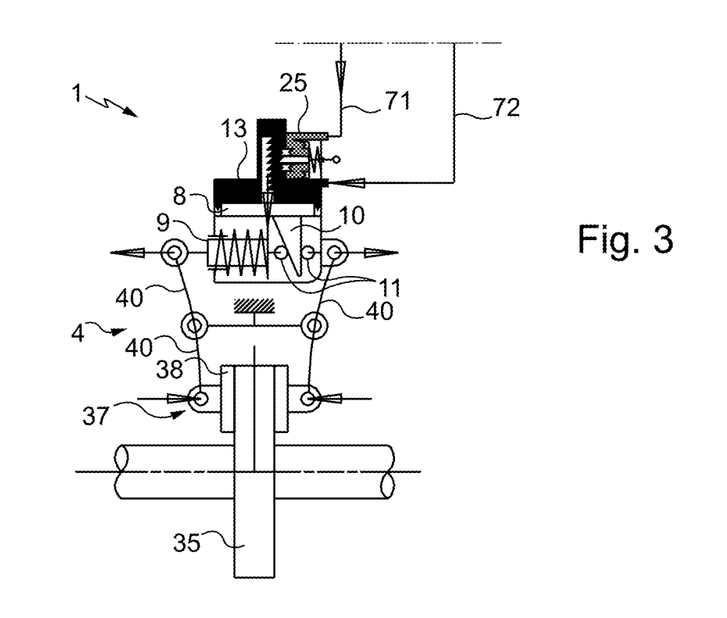
FIGS. 3 to 6 diagrammatically illustrate the operation of the rail vehicle braking system of FIG. 1, respectively in different configurations.

In FIG. 3, the rail vehicle braking system 1 is represented in a configuration for application of the service brake 6. The service brake setting CFS is thus not null.

In this configuration of application of the service brake 6, the service brake pressure chamber 13 is supplied by the service brake pipe 72, in which is conveyed a first source of pneumatic pressure agent.

This first source of pneumatic pressure agent may come, directly or indirectly, from the general pipe, or from the first auxiliary reservoir 74 or from the second auxiliary reservoir 75.

As will be seen below with reference to FIG. 9, this first source of pneumatic pressure agent may be generated by a pneumatic pressure generating device, based on a template pressure.

The service brake pressure chamber 13 is thus under pressure and the braking piston 8 has been moved in the first axial direction from its first position to a second position in which the wedge piece 10 has moved apart the set of rolling bearing stops 11, thereby moving the thrust rod 9 and the joint 44.

Therefore, the joints 44 and 45 move away from each other and give rise to the coming towards each other of the shoes 37 and thus the application of the linings 38 against the brake disk 35.

It should be noted that in the configuration for application of the service brake 6 of the system 1, the levers 40 are deformed (elastically).

It will also be noted that in this configuration illustrated in FIG. 3, the parking brake pressure chamber 25 is still under pressure as mentioned with reference to with reference to FIG. 1.

In this configuration of application of the service brake 6 of the system 1, the parking brake 7 is still in its reset configuration whereas the service brake 6 is in a working configuration.

It will also be noted that in the configuration illustrated in FIG. 3, the determined pressure value of the fluid injected into the service brake pressure chamber 13 moves the braking piston 8 by a predetermined travel in order to act on the braking linkage 4 with a first determined load and therefore apply a first determined force on the brake disk 35.

Figure 4:
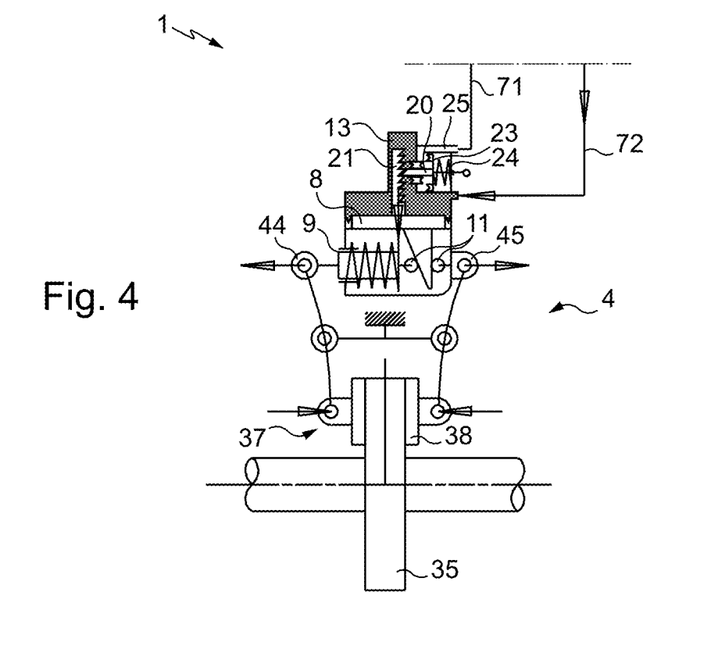

In FIG. 4, the rail vehicle braking system 2 is represented in a locking configuration in which the braking piston 8 of the service brake 6 is immobilized in its second position illustrated in FIG. 3.

It should be noted that the braking linkage 4 is here in the same position as that illustrated in FIG. 3.

As regards the service brake pressure chamber 13 this is still under pressure whereas the parking brake pressure chamber 25 has been vented. The service brake setting CFS and the parking brake setting CFP are thus not null.

The venting of the parking brake pressure chamber 25 frees the spring member 24, which moves the holding piston 23 from its first position towards a second position referred to as locking position and thus moves the blocking finger 20 from its first position to a second position in which it comes to immobilize the notched rod 21 by meshing of the distal end of that blocking finger 20 with notches formed on the notched rod 21.

In that same FIG. 4, the rail vehicle braking system 2 is also illustrated in a so-called oversupply configuration of the service brake 6.

The fluid conveyed by the service brake pipe 72 may come from the second source of pneumatic pressure agent and have a pressure value greater than the pressure value of the first source.

The oversupply of that service brake pressure chamber 13 by the fluid makes it possible to move the braking piston 8 to further open the set of rolling bearing stops 11 and thus move further apart the joints 44 and 45 of the braking linkage 4.

As a variant, the oversupply of the service brake pressure chamber 13 may be made via the dedicated intermediate pipe 73 in which is conveyed the second source of pneumatic pressure agent.

This moving apart which represents a second determined load greater than the first determined load applied by the braking piston 8 generates a second determined force greater than the first determined force on the brake disk 35 via the shoes 37.

It should be noted that the notched rod 21 and the blocking finger 20 are configured to enable such a movement of the braking piston 8 while the blocking finger 20 immobilizes that notched rod 21.

For example, the notched rod 21 has a predetermined teeth formation and the distal end of the blocking finger 20 also has a predetermined teeth formation complementary to the predetermined teeth formation of the notched rod 21.

It should be noted that the blocking finger 20 enables the movement of the notched rod 21 only in the direction of movement of the braking piston 8 to clamp the brake disk 35 still further and again immobilize the notched rod 21 as soon as the latter has been stopped, in the third position of the braking piston 8.

As a further variant, the fluid conveyed by the service brake pipe 72 may come from the second source of pneumatic pressure agent and have a pressure value substantially equal to or less than the pressure value of the first source; and, the case arising, this is not oversupply in the sense described above but a supply of the service brake pressure chamber 13 which enables a determined parking brake force to be ensured.

More generally, the pressure value of the second source is thus determined, relative to the pressure value of the first source, to apply a parking brake force which is also determined.

In these locking and oversupply configurations of the service brake 6, the parking brake 7 and the service brake 6 are each in a working configuration.

In a variant embodiment, the control and actuation unit 3 may receive a parking brake setting CFP that is not null while having previously received a null service brake setting CFS.

The case arising, the braking piston 8 of the service brake 6 is first of all immobilized in its first position illustrated in FIG. 1 then the service brake pipe 72 and/or the dedicated intermediate pipe 73 conveys a fluid from the second source of pneumatic pressure agent, by shunting the service brake pipe 72.

More generally, the operations of locking by the application of the parking brake 7 and of supplying and/or oversupplying of the service brake 6 can be carried out in any order; and these operations may also be carried out at the same time.

Figures 5, 6:
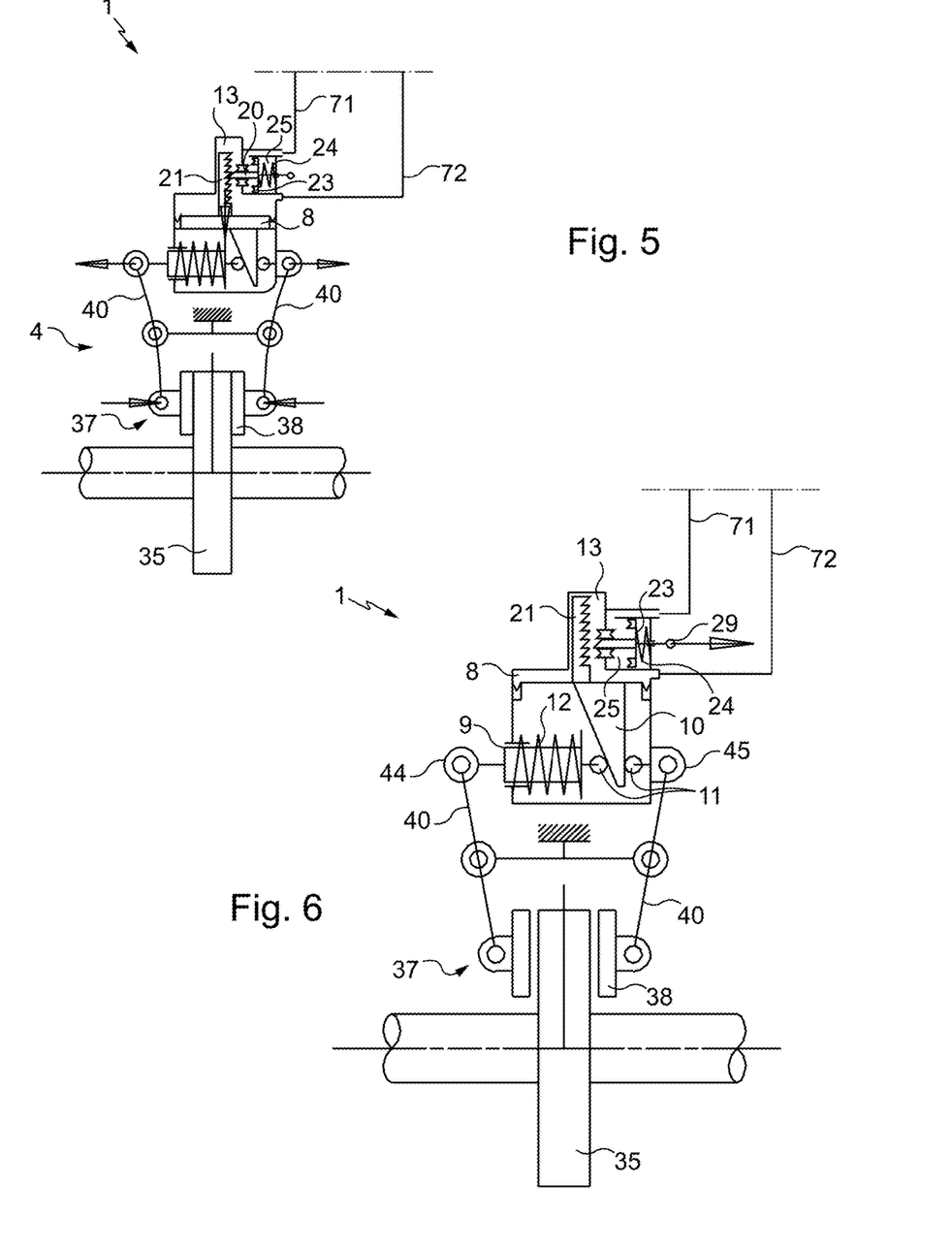

In FIG. 5, the rail vehicle braking system 2 is represented in a configuration for venting the service brake 6. The service brake setting CFS is null whereas the parking brake setting CFP is not null.

The venting of the service brake pressure chamber 13 may be carried out through the leakages in the network 3. In other words, neither the service pressure chamber 13, nor the service brake pipe 72 are directly connected to the atmosphere.

It should be noted that the fluid under pressure present in the service brake pressure chamber 13 exhausts from the latter in particular from the service brake pipe 72.

It will also be noted that, thanks to the parking brake 6 and in particular the group formed from the blocking finger 20, the holding piston 23 and the spring member 24, in combination with the notched rod 21 which is fastened to the braking piston 8 of the service brake 6, that braking piston 8 remains in its third position in which it acts on the braking linkage 4 to apply the predetermined second force on the brake disk 35 via the shoes 37, despite the venting of the service brake pressure chamber 13.

In this venting configuration of the service brake 6, the parking brake 7 is in a working configuration whereas the service brake 6 is blocked in its working configuration, despite the venting of the service brake pressure chamber 13.

In FIG. 6, the rail vehicle braking system 1 is represented in an unlocking configuration. The service brake setting CFS and the parking brake setting CFP are thus null.

In this unlocking configuration, a force has been applied to the unlocking part 29 of the parking brake 6 so as to pull that unlocking part 29 towards the outside of the body 2.

The movement of that unlocking part 29 drives the holding piston 23 and therefore the blocking finger 20 against the spring member 24 which is thereby compressed.

Due to the blocking finger 20 reaching its second position, the latter no longer cooperates with the notched rod 21, which is thus free.

Therefore, the spring 12 disposed around the thrust rod 9 and between the inside edge of the body 2 and the rolling bearing stop fastened to the thrust rod 9 resumes its initial position.

This spring 12 thus drives the rolling bearing stop 11 disposed between the thrust rod 9 and the wedge part 10 in the second axial direction, thereby driving the return of the braking piston 8 in the first axial direction, to reach its resting position.

The joints 44 and 45 of the braking linkage are brought towards each other such that the deformable levers 40 resume their initial positions illustrated in FIG. 1 and the shoes 37 are again situated away from the brake disk 35, which is thus free to rotate (the brake disk 35 is not braked).

In this unlocking configuration, the parking brake 7 is in an unlocking configuration whereas the service brake 6 is in a resting configuration.

It should be noted that the parking brake 6 is configured such that the force to apply for the unlocking, via the unlocking part 29, is relatively low in order to be provided manually by a user such as the driver of the rail vehicle. For example this force is of the order of approximately 5 to 50 daN.

Figure 7:
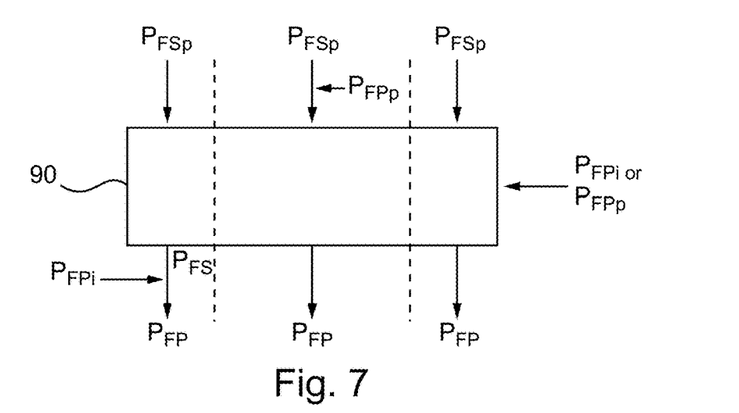
FIGS. 7 to 9 diagrammatically represent different system members of the control and actuation unit, operating in different configurations.

In FIG. 7, the control and actuation unit 3 comprises a relay device 90 configured to generate a pressure of use of the fluid based on a template pressure value.

According to an embodiment (on the left in FIG. 7), the relay device 90 is configured here to receive, as input, a template value of the first source of pneumatic pressure agent PFSp.

The relay device 90 is furthermore configured to generate and provide, as output, the determined value of the first source of pneumatic pressure agent PFS.

The case arising, the control and actuation unit 3 is configured to receive, downstream of the relay device 90, an intermediate value of the second source of pneumatic pressure agent PFPi which substitutes for or combines with the value of the first source of pneumatic pressure agent PFS to generate the determined value of the second source of pneumatic pressure agent PFP.

According to another embodiment (in the center of FIG. 7) the relay device 90 is configured to receive, as input, a template value of the first source of pneumatic pressure agent PFSp and a template value of the second source of pneumatic pressure agent PFPp which substitutes for or combines with the template value of said first source of pneumatic pressure agent PFSp.

The relay device 90 is furthermore configured to generate and provide, as output, the determined value of the second source of pneumatic pressure agent PFP.

According to still another embodiment (on the right in FIG. 7), the relay device 90 is configured to receive, as input, a template value of the first source of pneumatic pressure agent PFSp.

The relay device 90 is furthermore configured to receive, in the relay device 90, an intermediate value or a template value of the second source of pneumatic pressure agent, respectively PFPi or PFPp.

The relay device 90 is furthermore configured to generate and provide, as output, the determined value of the second source of pneumatic pressure agent PFP.

It will be noted that the relay device 90 may for example comprise shuttle valves, which may or may not be controlled, and/or solenoid valves, and/or actuators.

Figure 8:
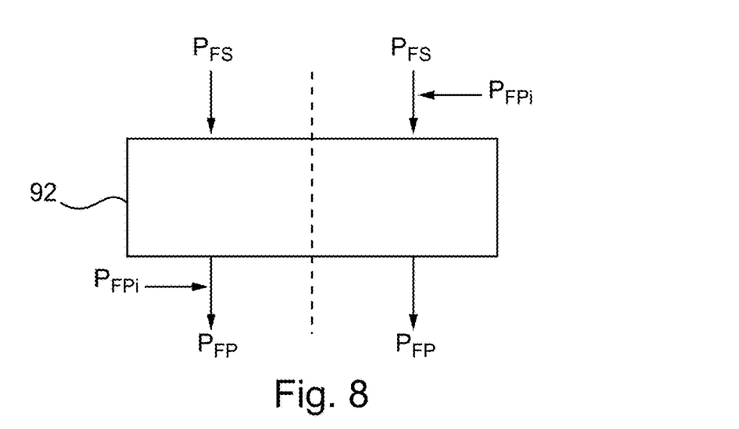

In FIG. 8, the control and actuation unit 3 comprises an anti-wheel-slide device 92 configured to ensure braking effectiveness of the rail vehicle.

In an embodiment (on the left in FIG. 8), the control and actuation unit 3 is configured to generate the determined value of the second source of pneumatic pressure agent PFP based in particular on the value of the first source of pneumatic pressure agent PFS and an intermediate value of the second source of pneumatic pressure agent PFPi which substitutes for or combines with the value of the first source of pneumatic pressure agent PFS, downstream of the anti-wheel-slide device 92.

In another embodiment (on the right in FIG. 8), the control and actuation unit 3 is configured to generate the determined value of the second source of pneumatic pressure agent PFP based in particular on the value of the first source of pneumatic pressure agent PFS and an intermediate value of the second source of pneumatic pressure agent PFPi which substitutes for or combines with the value of the first source of pneumatic pressure agent PFS, upstream of the anti-wheel-slide device 92.

It will be noted that the anti-wheel-slide device 92 may for example comprise shuttle valves, which may or may not be controlled, and/or solenoid valves, and/or actuators.

Figure 9:
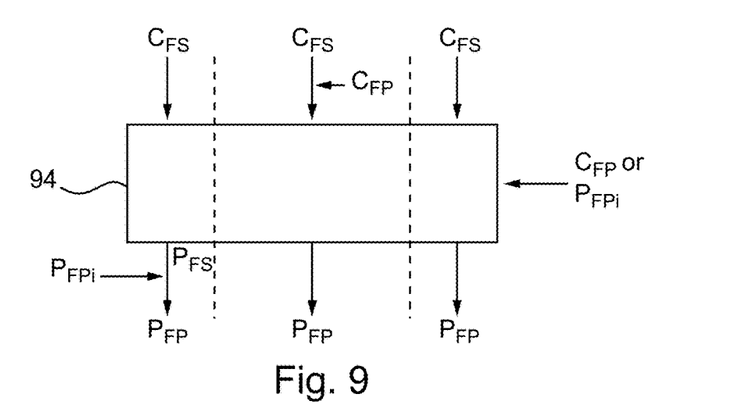

In FIG. 9, the control and actuation unit 3 comprises a pressure generating device 94 configured to generate the pressure value of the first source of pneumatic pressure agent.

In an embodiment (on the left in FIG. 9), this generating device 94 is configured to receive, as input, a service brake setting CFS.

This generating device 94 is furthermore configured to generate and provide, as output, the value of the first source of pneumatic pressure agent PFS.

The case arising, the control and actuation unit 3 is configured to receive, downstream of the generating device 94, an intermediate value of said second source of pneumatic pressure agent PFPi which substitutes for or combines with the value of the first source of pneumatic pressure agent PFS to generate the determined value of the second source of pneumatic pressure agent PFP.

In another embodiment (in the center of FIG. 9), the generating device 94 is configured to receive, as input, a service brake setting CFS and a parking brake setting CFP which substitutes for or combines with the service brake setting CFS.

The generating device 94 is furthermore configured to generate and provide, as output, the determined value of the second source of pneumatic pressure agent PFP.

In still another embodiment (on the right in FIG. 9), the generating device 94 is configured to receive, as input, a service brake setting CFS.

The generating device 94 is furthermore configured to receive, in the generating device 94, a parking brake setting CFP or an intermediate value of the second source of pneumatic pressure agent PFPi.

The generating device 94 is furthermore configured to generate and provide, as output, the determined value of the second source of pneumatic pressure agent PFP.

It will be noted that the generating device 94 may for example comprise solenoid valves, and/or sensors, and or pneumatic distributors, and/or other mechanical devices.

Figure 10:
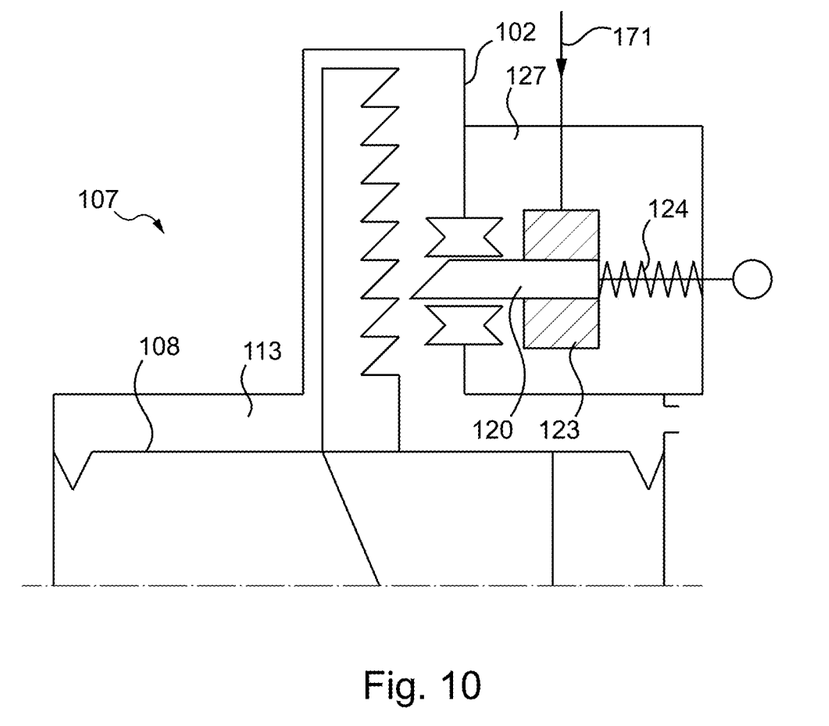
FIG. 10 is a similar view to that of FIG. 1, showing only partially the rail vehicle braking system in accordance with a second embodiment.

In accordance with a second embodiment of the rail vehicle braking system illustrated in FIG. 10, in the locking configuration, the actuation of the blocking device may be carried out by an electrical actuator rather than by pressurizing a pressure chamber supplied for example via a distributor.

Generally, the same reference numbers are used for similar parts but increased by 100.

The parking brake 107 here comprises an electrical actuator 123 which is movable relative to the body 102, disposed in the cavity 127, and on which is fastened the blocking finger 120; as well as a spring member 124 disposed between the body 102 and one side of the actuator 123. This spring member 124 is configured to act on that actuator 123 and therefore on the blocking finger 120 which is movable in the service brake pressure chamber 113 to act on the braking piston 108. The electrical actuator 123 and the spring member 124 here form a movable actuating device of the parking brake 107; which therefore lacks any parking brake pressure chamber.

The electrical actuator 123 is electrically connected here to a source of electrical supply by an electrical cable 171 configured to be connected to the control and actuation unit.

The case arising, the control and actuation unit is configured to determine a value of an electrical energy according to the parking brake setting, for the purpose of actuating the movable electrical actuator 123 at least into its locking position, for the movement of the blocking finger 120.

In a variant not illustrated, the control and actuation unit may be configured to determine a constant or variable fictional load parameter, according to the parking brake setting and/or the determined value of the second source of pneumatic pressure agent, and to substitute the received load parameter by the determined fictional load parameter.

This substitution of the load parameter by a determined fictional load parameter requires at least some of the parameters of the vehicle, in particular its service brake setting, to be initially governed by the load; and makes it possible for example to make these parameters that are naturally governed by the load not governed by the load.

In another variant not illustrated, the second and third sources of pneumatic pressure agent are combined or, in other words, the parking brake pressure chamber is supplied by the second source of pneumatic pressure agent.

In other variants not illustrated:

in the resetting configuration of the rail vehicle braking system, the operation of resetting is carried out electrically or mechanically or hydraulically rather than pneumatically;

in the unlocking configuration of the rail vehicle braking system, the unlocking part is held in an unlocking position of the parking brake by a lock that is pneumatic, electric or mechanical;

in the unlocking configuration of the rail vehicle braking system, the unlocking command is carried out manually through the use of at least one cable, or pneumatically, electrically or hydraulically;

the unlocking configuration of the rail vehicle braking system is obtained by supplying the parking brake pressure chamber, as for the resetting configuration rather than by the actuation of an unlocking part.

the service brake pressure chamber may be deliberately vented rather than by the leakage of the system, in particular before, or even after, the actuation of the unlocking part of the parking brake, to place the system in its unlocking configuration;

the rail vehicle braking system lacks the first auxiliary reservoir and/or the second auxiliary reservoir;

the control and actuation unit may be configured to modulate the value of the first source of pneumatic pressure agent according to the load parameter;

the control and actuation unit may be configured to receive and correct the service and/or emergency and/or parking brake settings according to the load parameter, and to modulate the template pressure values of the first source of pneumatic pressure agent according to the corrected setting or settings;

the rail vehicle braking system may comprise a service brake lacking a wedge part attached to the braking piston, such that this piston acts directly on the thrust rod, which acts on the deformable levers; and in that case, the braking piston together with its notched rod and the thrust rod are movable in the second axial direction whereas the parking brake is configured such that the blocking finger and the holding piston are movable in the first axial direction;

the rail vehicle braking system has a braking linkage different from that illustrated in the Figures, in particular the braking linkage comprises a block configured to act directly on a wheel of the rail vehicle, that block being directly jointed by a pivot type joint fastened to the thrust rod, a rigid lever fastened to the body of the system as well as a deformable lever fastened both to the rigid lever and to the joint on the block; and/or the rail vehicle braking system comprises a braking linkage configured to act on a brake having blocks as described above and is provided with a service brake with or without a wedge part attached to the braking piston.

It should be noted more generally that the invention is not limited to the examples described and represented.

The invention claimed is:

1. A rail vehicle braking system with brakes that have at least one lining or at least one block (5), comprising:
   a body (2; 102);
   a braking linkage (4) configured to act on at least one said brake that has at least one lining or at least one block (5);
   a service brake (6; 106) comprising a braking piston (8; 108) which is movable relative to said body (2; 102) to act on said braking linkage (4) and delimits with said body (2; 102) a service brake pressure chamber (13; 113) configured to be supplied by a first source of pneumatic pressure agent to put said braking piston (8; 108) into a service braking position; and
   a parking brake (7; 107) configured to act on said braking piston (8; 108) of said service brake (6; 106) and having a working configuration and a resting configuration;
   said rail vehicle braking system (1) being wherein said parking brake (7; 107) comprises:
   a blocking device (20; 120) which is movable relative to said body (2; 102) to act on said braking piston (8; 108) and having a first position and a second position in which said blocking device (20; 120) is configured to immobilize said braking piston (8; 108) in service braking position, said parking brake (7; 107) then being in working configuration;
   an actuating device (23, 24; 123, 124) which is movable relative to said body (2; 102) and having a locking position in which said actuating device (23, 24; 123, 124) is configured to hold said blocking device (20; 120) in its second position;
   said rail vehicle braking system (1) being configured such that, when said actuating device (23, 24; 123, 124) is in its locking position, said service brake pressure chamber (13; 113) is supplied by a second source of pneumatic pressure agent of which the pressure value is determined, in order to apply, when said parking brake (7; 107) is in working configuration, a determined braking force;
   said rail vehicle braking system (1) further comprising a control and actuation unit (3) configured to:
   receive an information item representing a value of said first source of pneumatic pressure agent;
   process an information item representing a parking brake setting at least in its working configuration, for the purpose of actuating said movable actuating device (23, 24; 123, 124) at least in its locking position; and
   determine a value of said second source of pneumatic pressure agent according to said parking brake setting and said information item representing a value of said first source of pneumatic pressure agent, for the purpose of supplying said service brake pressure chamber (13; 113).

2. A system according to claim 1, wherein said information item representing said value of said first source of pneumatic pressure agent and said information item representing said parking brake setting each correspond to an electrical or pneumatic or mechanical signal.

3. A system according to claim 1, wherein said actuating device (23, 24) delimits with said body (2) a parking brake pressure chamber (25) configured to be supplied by a third source of pneumatic pressure agent, said control and actuation unit (3) being furthermore configured to determine a value of said third source of pressure agent according to said parking brake setting, for the purpose of actuating said movable actuating device (23, 24) at least in its locking position.

4. A system according to claim 3, wherein said control and actuation unit (3) is in fluidic communication with a conveyance network of pneumatic pipes (70), which network comprises a main pipe and a general pipe which are configured to convey a fluid at least at a predetermined first pressure, optionally a first auxiliary reservoir (74) configured to store a fluid at a predetermined second pressure and which is connected to said main pipe, and/or also optionally a second auxiliary reservoir (75) configured to store a fluid at a predetermined third pressure and which is connected to said main pipe.

5. A system according to claim 4, wherein that said conveyance network of pneumatic pipes further comprises a first supply pipe (72) connected between said control and actuation unit (3) and said service brake pressure chamber and configured to convey a fluid at a pressure coming from at least one of the first and second sources of pneumatic pressure agent.

6. A system according to claim 5, wherein said conveyance network of pneumatic pipes further comprises a dedicated intermediate pipe (73) configured to convey solely a fluid coming from said second source of pneumatic pressure agent when said parking brake is in working configuration, into said service brake pressure chamber.

7. A system according to claim 6, wherein said control and actuation unit (3) is configured to supply said service brake pressure chamber via said dedicated intermediate pipe (73) by shunting said first supply pipe (72).

8. A system according to claim 4, wherein said conveyance network of pneumatic pipes further comprises a second supply pipe (71) connected between said control and actuation unit and said parking brake pressure chamber and configured to convey a fluid at a pressure coming from the third source of pneumatic pressure agent.

9. A system according to claim 1, wherein said actuating device (123, 124) is configured to be electrically actuated, said control and actuation unit being furthermore configured to determine an electrical energy value according to said parking brake setting, for the purpose of actuating said movable actuating device (123, 124) at least in its locking position.

10. A system according to claim 1, wherein said determined pressure value of said second source of pneumatic pressure agent is greater than, equal to or less than that of said first source of pneumatic pressure agent, in order to apply, when said parking brake (7; 107) is in working configuration, a braking force respectively greater than, equal to or less than the braking force applied when said braking piston (8; 108) is in its service braking position and said parking brake (7; 107) is in its resting configuration.

11. A system according to claim 1, wherein said control and actuation unit (3) is furthermore configured to determine a corrected value of said first source of pneumatic pressure agent and said determined value of said second source of pneumatic pressure agent is equal to said corrected value.

12. A system according to claim 1, wherein said determined value of said second source of pneumatic pressure agent is constant or variable according to said received information item representing said value of said first source of pneumatic pressure agent.

13. A system according to claim 1, wherein said control and actuation unit (3) is furthermore configured to receive an information item representing a service brake setting and to determine said parking brake setting according to said received information item representing said service brake setting.

14. A system according to claim 1, wherein said control and actuation unit (3) is furthermore configured to receive at least one information item representing at least one parameter of use of said rail vehicle and said value of said second source of pneumatic pressure agent is furthermore determined according to said at least one information item representing of said at least one parameter of use of said rail vehicle.

15. A system according to claim 14, wherein said at least one parameter of use of said rail vehicle is chosen from a traction parameter, a velocity parameter, a load parameter, an anti-wheel-slide parameter, a pneumatic pressure parameter and an electrical energy parameter.

16. A system according to claim 1, wherein said control and actuation unit (3) is furthermore configured to receive at least one information item representing at least one parameter of use of said rail vehicle and to determine said parking brake setting according to said at least one information item representing said at least one parameter of use of said rail vehicle.

17. A system according to claim 1, wherein said control and actuation unit (3) comprises a relay device (90) configured to receive, as input to relay device (90), a template value of said first source of pneumatic pressure agent, and to generate and provide, as output from said relay device (90), said value of said first source of pneumatic pressure agent; and said control and actuation unit (3) is furthermore configured to receive, downstream of said relay device (90), an intermediate value from said second source of pneumatic pressure agent which substitutes for or combines with said value of said first source of pneumatic pressure agent to generate said determined value of said second source of pneumatic pressure agent.

18. A system according to claim 1, wherein said control and actuation unit (3) comprises a relay device (90) configured to receive, as input to said relay device (90), a template value of said first source of pneumatic pressure agent and a template value of said second source of pneumatic pressure agent which substitutes for or combines with said template value of said first source of pneumatic pressure agent, and to generate and provide, as output from said relay device (90), said determined value of said second source of pneumatic pressure agent.

19. A system according to claim 1, wherein said control and actuation unit (3) comprises a relay device (90) configured to:
receive, as input to said relay device (90), a template value of said first source of pneumatic pressure agent;
receive, in said relay device (90), an intermediate value or a template value of said second source of pneumatic pressure agent; and
generate and provide, as output from said relay device (90), said determined value of said second source of pneumatic pressure agent.

20. A system according to claim 1, wherein said control and actuation unit (3) comprises an anti-wheel-slide device (92) and said control and actuation unit (3) is configured to generate said determined value of said second source of pneumatic pressure agent based on said value of said first source of pneumatic pressure agent and an intermediate value of said second source of pneumatic pressure agent which substitutes for or combines with said value of said first source of pneumatic pressure agent, either downstream or upstream of said anti-wheel-slide device (92).

21. A system according to claim 1, wherein said control and actuation unit (3) further comprises a generating device (94) for generating the value of said first source of pneumatic pressure agent configured to receive, as input to said generating device (94), a service brake setting, and to generate and provide, as output from said generating device (94), said value of said first source of pneumatic pressure agent; and said control and actuation unit (3) is furthermore configured to receive, downstream of said generating device (94), an intermediate value of said second source of pneumatic pressure agent which substitutes for or combines with said value of said first source of pneumatic pressure agent to generate said determined value of said second source of pneumatic pressure agent.

22. A system according to claim 1, wherein said control and actuation unit (3) comprises a generating device (94) for generating the value of said first source of pneumatic pressure agent configured to receive, as input to said generating device (94), a service brake setting and a parking brake setting which substitutes for or combines with said service brake setting, and to generate and provide, as output from said generating device (94), said determined value of said second source of pneumatic pressure agent.

23. A system according to claim 1, wherein said control and actuation unit (3) comprises a generating device (94) for generating the value of said first source of pneumatic pressure agent configured to:
receive, as input to said generating device (94), a service brake setting;
receive, in said generating device (94), a parking brake setting or an intermediate value of said second source of pneumatic pressure agent; and
generate and provide, as output from said generating device (94), said determined value of said second source of pneumatic pressure agent.

24. A system according to claim 1, wherein said control and actuation unit (3) is furthermore configured to:
receive at least one information item representing a load parameter of said vehicle;
determine a fictional load parameter of said vehicle according to said parking brake setting and/or said determined value of said second source of pneumatic pressure agent; and
substitute said received load parameter with said determined fictional load parameter.

25. A method of braking a rail vehicle comprising a rail vehicle braking system (1) according to claim 1, comprising:
the step of receiving an information item representing a value of said first source of pneumatic pressure agent;
the step of supplying the service brake pressure chamber (13; 113) of said system (1) with said value of said first source of pneumatic pressure agent so as to put said braking piston (8; 108) in service braking position;
the step of processing an information item representing a parking brake setting at least in its working configuration;
the step of actuating said movable actuating device (23, 24; 123, 124) at least in its locking position according to said parking brake setting; and
the step of determining a value of said second source of pneumatic pressure agent according to said parking brake setting and said information item representing a value of said first source of pneumatic pressure agent, for the purpose of supplying said service brake pressure chamber (13; 113).

26. A method according to claim 25, further comprising the step of supplying said service brake pressure chamber (13; 113) with said value of said second source of pneumatic pressure agent; and the step of venting said service brake pressure chamber (13; 113).

* * * * *